United States Patent Office 3,681,269
Patented Aug. 1, 1972

3,681,269
SWELLABLE POLYMERS OF METHACRYLIC AND ACRYLIC ACID ESTERS
Walter Heitz, Mainz-Kostheim, and Klaus Pfitzner, Darmstadt, Germany, assignors to Merck Patent Gesellschaft mit beschrankter Haftung, Darmstadt, Germany
No Drawing. Filed Feb. 13, 1970, Ser. No. 11,310
Claims priority, application Germany, Feb. 15, 1969, P 19 07 666.5
Int. Cl. C08f 3/64, 3/66
U.S. Cl. 260—2.5 B                 13 Claims

ABSTRACT OF THE DISCLOSURE

The polymerization of dimethacrylate and diacrylate esters of alkylene and polyalkylene glycols of the formula

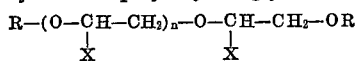

wherein $n$ is an integer from 0 to $10^5$ and trimethacrylate and triacrylate esters of polyalkylene oxide triols of the formula

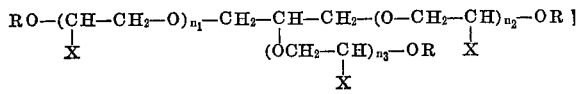

wherein $n_1$, $n_2$ and $n_3$ are integers the sum of which is from 3 to $10^4$, X in each instance being H or $CH_3$ and R being the acyl group of methacrylic or acrylic acid, optionally in the presence of up to 40% by weight of an additional cross-linking agent, produces swellable gels useful as gel chromatography agents.

BACKGROUND OF THE INVENTION

This invention relates to new, swellable polymers and to a process for the production thereof.
Various swellable polymers are known which can be used, for example, as gel chromatography agents. Examples are cross-linked polystyrene, cross-linked polyvinyl acetate, cross-linked polymethyl methacrylate, cross-linked dextrans, celluloses, polysaccharides and polyvinyl alcohols. Cross-linked polymers of hydrophilic esters of methacrylic acid, for example, of β-hydroxyethyl methacrylate and of diethylene glycol dimethacrylate, have also been used as gel chromatography agent. However, such hydrophilic esters have the disadvantage that, because of their water-solubility, either they cannot be subjected to suspension polymerization or, if they can, only with difficulty. Glycidyl methacrylate polymers have also been used as gels and give pearl-like products but they possess serious disadvantages because of the reactivity of the epoxy groups which, under the conditions of the polymerization and also by ring opening, lead to additional cross-linkings which cannot be controlled or can be controlled only with difficulty.
Such known gels are obtained either by cross-linking polymers which contain functional groups along the main chain with low molecular weight compounds or by the polymerization of monovinyl compounds with divinyl compounds, which act as cross-linking agents. Specifically, glycol monomethacrylates have been co-polymerized with glycol dimethacrylates, the diesters cross-linking the linear chains of the monoesters formed by the polymerization.

OBJECTS OF THE INVENTION

It is an object of this invention to provide polymers of esters of methacrylic and acrylic acid which are swellable gels useful as gel chromatography agents. It is another object to provide a process for their production. It is another object to provide a method of gel chromatography using these swellable polymers as gel chromatography agents. Other objects will be apparent to those skilled in the art to which this invention pertains.

SUMMARY OF THE INVENTION

According to this invention, swellable polymers are obtained by the polymerization of glycols and triols which are completely esterified with acrylic or methacrylic acid.

DETAILED DESCRIPTION OF THE INVENTION

The polymers of this invention are swellable polymers of esters of acrylic or methacrylic acid. They consist essentially of polymerized dimethacrylates or diacrylates of alkylene glycols and/or polyalkylene glycols and/or trimethacrylates or triacrylates of polyalkylene oxide triols, the alkylene radicals of which contain 2 or 3 carbon atoms. These polymers possesses a take-up capacity for a swelling agent of 15–98%, calculated on the swollen polymer. The preferred polymers have a swelling factor of about 2–20 ml./g., preferably of 2–10 ml./g.
The swellable polymers of this invention are useful as gels for chromatography in both organic and aqueous media. They are swellable both in water and in organic solvents.
According to the proccess of this invention, dimethacrylates and dicarylates of alkylene glycols and/or of polyalkylene glycols and/or trimethacrylates or triacrylates of polyalkylene oxide triols, the alkylene radicals of which contain 2 or 3 carbon atoms, are polymerized. The polymerization optionally can be carried out in the presence of 0.01–40% by weight of one or more additional conventional cross-linking agents containing at least two vinyl radicals.
The diesters used to produce the gels of this invention can be represented by the formula

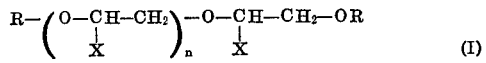

wherein X is a hydrogen atom or a methyl radical, R is the acyl group of acrylic ($CH_2=CHCO—$) or methacrylic ($CH_2=C(CH_3)CO—$) acid and $n$ is a whole number of from 0–$10^5$, preferably from 1–1,000.
The triesters used to produce the gels of this invention can be repersented by the formula

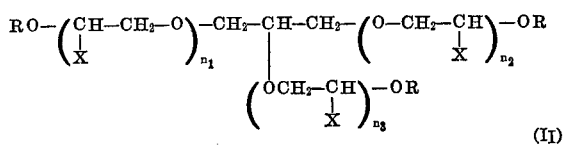

wherein R and X have the values given above, and $n_1$, $n_2$ and $n_3$ are whole numbers, the sum of which ($n$) is a whole number from 3 to $10^4$, preferably 20–100.
The acrylates or methacrylates used as starting materials are known or can be produced by known procedures. Preferred starting compounds are the diacrylates and dimethacrylates of ethylene glycol, diethylene glycol, triethylene glycol and tetraethylene glycol, as well as of propylene glycol and higher homologues thereof. Examples of readily available types of polyethylene oxides and glycols are those having average molecular weights of 200, 300, 400, 600, 1000, 1500, 3000, 4000, 5000, 10,000 and 20,000. Preferred are esters of Formula I wherein $n$ is from 1 to 1,000. Readily available propylene glycols have average molecular weights of 250, 3000 and 4000. Preferred are the trimethacrylates and triacrylates of polypropylene oxide triols, e.g., those of Formula II wherein the sum of $n_1$, $n_2$ and $n_3$ is 20 to 100 and X is $CH_3$. Mixtures of these starting materials can be used, sometimes to advantage, for example, when a long-chained polyalkylene glycol dimethacrylate is co-polymerized with ethylene glycol dimethacrylate.

A preferred class of starting esters are ethylene glycol dimethacrylate, di-, tri- and tetraethylene glycol dimethacrylates, polyethylene glycol dimethacrylate, polypropylene oxide triol trimethacrylate, and mixtures thereof. Methacrylate esters are preferred, especially dimethacrylate esters of the glycols, e.g., of polyethylene glycols defined above.

Both short-chained and long-chained diesters and triesters are suitable for the production of the swellable polymers. The polymers with long chains, i.e., those in which $n$ is a large number, e.g., at least 10, produce highly hydrophilic gels because the numerous ether oxygen atoms in the chain offer the possibility for the formation of numerous hydrogen bridges. By forming polymers with shorter chains, the hydrophilic properties of the polymers can be varied in any desired manner.

According to this invention, the short and middle chain alkylene glycol (or alkylene oxide triol) di- or triacrylates or methacrylates are, as a rule, polymerized in the absence of any additional cross-linking agent since the resultant polymers possess satisfactory mechanical strengths without additional cross-linking. With esters of higher chain lengths, it is preferable to co-polymerize with a shorter-chained glycol diacrylate or methacrylate as defined herein or a conventional cross-linking agent containing at least two vinyl radicals. The amount of such an additional cross-linking agent can be between 0.01 and 40% by weight, based on the starting compounds.

The starting compounds can be produced by known and conventional procedures. For example, the glycols or polyalkylene oxide triols can be esterified in the usual manner, e.g., with acylation agents, such as the appropriate acid anhydride or acid chloride, or with acrylic acid or methacrylic acid in the presence of a conventional catalyst, e.g., sulphuric acid, perchloric acid or p-toluene-sulphonic acid. The reaction of acrylic or methacrylic acid chloride with the glycols or triols preferably is conducted in the presence of a base, for example, triethylamine or pyridine. The starting compounds can also be produced by the transesterification of methyl acrylate or methyl methacrylate with the selected di- or triols in the presence of a transesterification catalyst, e.g., sodium methylate.

The reaction products can be worked up and isolated by a known manner.

The pore structure of the polymers can be regulated by the chain length of the starting materials. If it is desired to produce gels with a macroporous structure, inert diluents can also be added during the polymerization. To increase the degree of cross-linking, and thus the porosity of the gels, the starting materials can be copolymerized with a low molecular weight conventional crosslinking component.

Examples of such cross-linking agents are compounds with two or more vinyl radicals, e.g., dimethacrylates and diacrylates of diols and polyols, for example, 2,2-dimethyl-propane-1,3-diol diacrylate or dimethacrylate, butane-1,4-diol diacrylate or dimethacrylate and hexane-1,6-diol diacrylate or dimethacrylate; divinyl-benzene; divinyl-pyridine; divinyl ethers, for example, ethylene glycol divinyl ether and butane-1,4-diol divinyl ether; diallyl esters, for example, diallyl phthalate; divinyl esters, for example, adipic acid divinyl ester; and other compounds with two or more non-conjugated double bonds, e.g., allyl acrylate, allyl methacrylamide, N,N-methylene-diacrylamide, vinyl methacrylate, diallyl-dimethyl-silane or diallyl sulphone; and mixtures of any of these compounds. The preferred cross-linking agents are one or more di-esters of methacrylic acid or of acrylic acid with diols containing 4–6 carbon atoms, e.g., butane-1,4-diol and hexane-1,6-diol.

The production of the swellable polymers of this invention can be carried out by conventional methods. For example, the polymerization can be carried out by emulsion or by precipitation or pearl polymerization. Pearl polymerization is preferred because the particle size of the swellable polymer can thereby be controlled from the start, thus avoiding losses which arise by comminution and sieving. Also, gels produced by pearl polymerization give better column packing. The production of the gels of this invention by pearl polymerization also has the advantage that the polymerization can be carried out as an oil-in-water polymerization, which technically is easier to control.

The pearl polymerization can be carried out by all the conventional processes described in the literature. Free radical initiation, which often is preferred, can be brought about, for example, by oxidation agents, such as peroxides, and especially dibenzoyl peroxide, dilauroyl peroxide or di-o-tolyl peroxide, or by azo compounds, e.g., azo-isobutyronitrile. Redox initiation is also possible, for example, by the use of the system sodium dithionite/alkali-metal peroxydisulphate. The initiators are added in the usual way in concentrations of 0.01 to 10, preferably of 0.1 to 2%.

The pearl polymerization is generally carried out at a temperature of about 20° C. up to the boiling point of the lowest boiling starting material, preferably from about 40–90° C.

The pearl polymerization is carried out advantageously at a pH between 5 and 8.5, preferably at about 7.5. It is advantageous to add a buffer substance, e.g., a phosphate buffer, during the pearl polymerization. Conventional phosphate buffers are mixtures of alkali metal (especially sodium) hydrogen phosphates and dihydrogen phosphates.

There can be present in the polymerization conventionally used surface-active materials. In the case of an emulsion polymerization, there are preferably used ionogenic substances, e.g., soaps or paraffin sulphonates, in concentrations of 0.01 to 10%, preferably of 0.1 to 2%. In pearl polymerization, it is generally preferred to use water-soluble colloids, especially polyvinyl alcohols or partially saponified polyvinyl acetate, polyvinyl pyrrolidone, starch, pectins or similar compounds known to be useful for this purpose, preferably at a concentration of about 0.01 to 10% by weight, more preferably 0.05 to 3% by weight.

The ratio of organic to aqueous phase in the case of a pearl polymerization is generally between 1:1 and 1:20, preferably between 1:2 and 1:5.

Pore formation can be influenced, especially in pearl polymerization or in polymerization in substance, by the addition of certain materials before or during the polymerization. Particularly preferred for this purpose are diluents which are solvents for the compounds used as starting materials and are swelling agents for the resultant polymers, for example, ethyl acetate, benzene, toluene or amyl alcohol; as well as substances which are solvents for the starting materials but are precipitants for the cross-linked polymers, for example, aliphatic hydrocarbons, e.g., octane, dodecane and petroleum ether, and the higher alcohols, especially hexanol, octanol, decanol and heptanol, and also ethers, e.g., dibutyl ether. A mixture of such solvents can also be used. There can also be incorporated in the polymer, without chemical bonding, inert substances which are subsequently removed from the gel, e.g., polymers, such as polystyrene, and insoluble salts, such as alkaline earth metal carbonates, especially calcium carbonate.

The choice of such additional materials is influenced by the other polymerization conditions, especially by the solvents and/or precipitating agents and/or suspension agents employed. Depending upon the desired pore size of the gel, a mixture of such additional materials of this kind can be used simultaneously. By means of these additives, a wide variety of molecular weight exclusion limits can be achieved. "Exclusion limit" is a measure of the pore diameter of a gel, which is usually given as the molecular weight of the smallest molecule which cannot penetrate the pores of the gel. Thus, by the addition of a precipitation agent/solvent, there can be achieved exclusion limits which correspond to exclusion molecular weights of up to about $10^{10}$, preferably $10^3$ to $10^8$. The addition of soluble polymeric substances permits the production of gels with high exclusion limits.

By the addition of solid materials which, after the production of the swellable polymers, are to be removed again, there can, however, also be produced products with substantialy higher exclusion limits.

In comparison with known gels for chromatography, the new products possess considerable advantages. They can be used not only in the hydrophobic region but also in the hydrophilic region. They are also characterized by very great resistance to hydrolysis, both in acidic and alkaline media, and also by great resistance to bacterial attack. By means of pearl polymerization, there are obtained products with especially good mechanical properties which are particularly useful for column chromatography.

The new polymers are swellable not only in water but also in organic solvents. They can take up several times their own volume of such liquids by swelling. The amount of swelling agent which can be taken up by the polymers according to the present invention is usually between 15 and 98%, based on the swollen polymer. As swelling agent there can be used, depending upon the nature of the polymer, both hydrophilic and hydrophobic solvents and mixtures thereof. In particular, there can be used mixtures of water with hydrophilic solvents, for example with lower aliphatic alcohols, e.g., methanol and/or ethanol. In principle, however, there can be used any liquid phase which does not attack the swellable polymers.

The swelling factor of the new gels is between 2 and 20 ml./g., preferably between 2 and 10 ml./g.

The preferred particle size of the gels (diameter), depending on the intended use thereof, is between 0.001 and 5 mm., preferably between 0.01 and 0.5 mm., in an unswollen state. The bulk density of the gels obtained is between about 1 and 10 ml./g.

In principle, the new swellable polymers can be used wherever swellable or swollen polymeric products are used. A particularly important field of use is in gel chromatography.

The gels of this invention can be used for practically all separations in which gel permeation chromatography can be used. The new gels can be used, for example, for the separation of substances with very widely distributed molecular weights. The gel is selected according to the intended field of use, i.e., the substances to be separated, the desired separation capacity and the filter velocity. Both low molecular weight substances and high molecular weight substances can be separated with the gels according to this invention. The new gels are especially well suited for the separation of substances having molecular weights above 500, particularly those above 1000, because such substances can very often be separated only with difficulty by other methods.

In organic solvents, the gels can be used for the separation of polymers and co-polymers, e.g., polystyrene, polymethyl methacrylate and polyvinyl acetate. In water, they can be used for the separation of water soluble polymers, e.g., polyethylene oxides, dextrans, polypeptides and polynucleotides. Gels with a high molecular weight exclusion limit can also be used to separate colloidal particles, e.g., cell fractions and emulsion polymers.

The starting materials of this invention produce gels with a uniform mesh aperture, i.e., the gels separate in a narrow molecular weight range and are thus more selective.

Special uses of the new gels include, for example, the determination of the molecular weight distribution of polymers. In the oligomeric range, molecularly uniform substances can be isolated. For example, oligophenylenes, oligourethanes, oligoethylene glycols and oligostyrenes can be separated into molecularly uniform fractions. In the case of polymers, for example, polystyrene, polyvinyl acetate or polyvinyl chloride, their molecular weight distribution can be determined and highly uniform fractions can be obtained on a preparative scale.

The new gels can also be used to advantage for the separation of colloidal substances, especially sensitive colloids, e.g., enzymes or viruses, from substances in true solution. Advantages are also obtained in the treatment of mixtures which contain proteins or polypeptides, for example, plasma proteins, enzymes, e.g., pepsin or pancreas enzyme, and hormones, e.g., insulin. They can also be used for the separation of polysaccharides, e.g., amylodextrins, heparin and amyloses.

The new gels can also be used for the separation of complicated mixtures which contain several compounds of different types, for example, biological fluids, such as plant extracts or extracts from micro-organisms or animal organs. A separation and also a purification can thereby be achieved. For example, the gels can be used for the fractional separation of blood plasma, sera, enzymes and other proteins or proteides, peptides, nucleic acids, vitamins, co-enzymes, hormones, antibiotics, alkaloids and carbohydrates.

The new gels can be used for the separation of high molecular weight and ionic substances, e.g., for the deionization, e.g., desalination of proteins, which can be carried out quantitatively and without loss, the high molecular weight components being eluted in the first fractions of the gel chromatography. They can also be used in the form of membranes and membrane tubes for dialysis or for desalination.

Thus, for example, high molecular weight naturally occurring materials, e.g., proteins, carbohydrates and nucleic acids, can be transferred from one ionic medium to another ionic medium. In this case, not only the nature of the ions but also their concentrations and/or the pH value of the solution can be varied.

The technique of using the new gels according to the present invention does not differ from that of the known stationary phases in gel chromatography. Usually, the gels are packed into columns, through which the eluent flows upwardly or downwardly. Frequently, it is expedient to allow solvent to flow through the column during the packing thereof in order to achieve a uniform packing of the gel. The gel must be pre-swollen until an equilibrium state is reached. Normally, the same solvent is used for this pre-swelling as is intended to be used in the subsequent elution. Sometimes, in order to save time, it is also expedient to carry out the chromatography under pressure. The use of elevated temperatures, e.g., 30–150° C., during the gel chromatography permits the separation of substances whose solubility at ambient temperature is too low to obtain a solution thereof.

Mixtures of the new gels can be used for the chromatography. Such mixtures are particularly desirable, for example, when a broader pore size distribution is to be achieved, with which a greater range of molecular weights can be covered.

Without further elaboration, it is believed that one-skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

A solution of 250 g. tetraethylene glycol dimethacrylate, 500 ml. butyl acetate and 2.5 g. azo-isobutyronitrile is suspended in a solution of 6 g. partially saponified polyvinyl acetate (about 88% polyvinyl alcohol) and 20 g. sodium dihydrogen phosphate in 4 liters water. The stirred reaction mixture is polymerized for 6 hours at 60° C. The butyl acetate is then removed with steam and the particles with a size of 40–80μ are sieved out. The gel particles have an opaque appearance when examined microscopically. In tetrahydrofuran, the gel has an exclusion molecular weight of $5 \times 10^6$ for polystyrene. In water it has an exclusion molecuar weight of $10^7$ for dextrans. The bulk density is 1.65 ml./g. and the swelling factor in water is 4.3 ml./g. and 5.5 ml./g. in tetrahydrofuran.

Very similar gels are also obtained when using the corresponding acrylate instead of the methacrylate ester of tetraethylene glycol.

Example 2

(a) 200 g. polyethylene oxide (average M.W. 1000) are slowly reacted, with cooling, with 50 g. methacrylic acid chloride in the presence of 200 ml. toluene and 65 g. triethylamine. After 12 hours, the triethylamine hydrochloride formed is filtered off with vacuum. The filter cake is then washed with 200 ml. toluene and the wash liquid combined with the main filtrate.

(b) The polyethylene glycol dimethacrylate produced in (a) above is mixed with 60 g. ethylene glycol dimethacrylate and 2.6 g. azo-isobutyronitrile. The organic phase is suspended in a solution of 20 g. sodium dihydrogen phosphate and 6 g. partially (about 88%) saponified polyvinyl acetate in 4 liters water. The polymerization and work-up is conducted in the manner described in Example 1. The gel obtained separates polystyrene in the molecular weight range of 3000 to 7000 and polyethylene oxides in the molecular weight range of 1500 to 5000. The swelling factor is 3.2 ml./g. in water and 3.4 ml./g. in tetrahydrofuran.

Instead of the dimethacrylate of polyethylene glycol 1000, the corresponding diacrylate can also be used with equal success.

Example 3

250 g. tetraethylene glycol dimethacrylate are pearl polymerized in the presence of 1 liter of isoamyl alcohol in the manner described in Example 1. The gel obtained has a bulk density of 1.8 ml./g. and a swelling factor of 4 ml./g. in water and of 5 ml./g. in tetrahydrofuran. Its exclusion molecular weight for polystyrene in tetrahydrofuran is 50,000, for dextrans in water is 20,000 and for polyethylene oxides in water is 30,000.

Example 4

200 g. polyethylene oxide (average M.W. 1000) are esterified with methacrylic acid chloride in the manner described in Example 2a. The toluene is then removed under reduced pressure. The polyethylene glycol dimethacrylate obtained is mixed with 500 ml. isoamyl alcohol and 20 g. ethylene glycol dimethacrylate and a pearl polymer produced in the manner described in Example 1. The gel has an exclusion molecular weight of 4000 for polyethylene oxides in water and of 1200 for polystyrene in tetrahydrofuran. The swelling factor is 5.5 ml./g. in water and tetrahydrofuran.

The dimethacrylate of polyethylene glycol 1,000 can be replaced partially or completely by the corresponding diacrylate.

Example 5

200 g. polyethylene oxide (average M.W. 400) are dissolved in 200 ml. butyl acetate and esterified, in the presence of 121 g. triethylamine, with 115 g. methacrylic acid chloride to give polyethylene glycol dimethacrylate. After 12 hours, a further 250 ml. butyl acetate are added and this mixture is pearl polymerized in the manner described in Example 1, using 2.5 g. azo-isobutyronitrile as initiator. For polystyrene in tetrahydrofuran, the gel has an exclusion molecular weight of 50,000. Its swelling factor is 4.2 ml./g. in water and 4.8 ml./g. in tetrahydrofuran.

Example 6

200 g. polypropylene oxide triol (average M.W. 3000) are dissolved in 200 ml. benzene and reacted with 28 g. methacrylic acid chloride in the presence of 40 g. triethylamine. After 12 hours, the triethylamine hydrochloride formed is filtered off with suction and the volatile components are removed in a vacuum. The polypropylene oxide triol trimethacrylate obtained as the residue is mixed with 1 liter amyl alcohol and pearl polymerized in the manner described in Example 1. The gel obtained has a swelling factor of 4 ml./g. in tetrahydrofuran.

When acrylic acid chloride is used instead of methacrylic acid chloride, there is obtained the corresponding gel polymer of polypropylene oxide triol triacrylate.

Example 7

In a manner analogous to that described in Example 1, 250 g. triethylene glycol dimethacrylate, 500 ml. butyl acetate and 2.5 g. azo-isobutyronitrile are suspended in 4 liters water which contains 6 g. partially saponified polyvinyl acetate (about 88% polyvinyl alcohol) and 20 g. sodium dihydrogen phosphate. There is obtained a gel with a bulk density of 1.65 ml./g. and a swelling factor in tetrahydrofurn of 4 ml./g.

Example 8

In a manner corresponding to that described in Example 1, 250 g. diethylene glycol dimethacrylate are pearl polymerized in the presence of 500 ml. isoamyl alcohol. The gel obtained has a bulk density of 1.8 ml./g. and a swelling factor of 4.5 ml./g. in tetrahydrofuran.

Example 9

In a manner analogous to that described in Example 2a, 200 g. polyethylene oxide (average M.W. 1000) are esterified with methacrylic acid chloride. The toluene is removed under reduced pressure. The polyethylene glycol dimethacrylate obtained is mixed with 500 ml. isoamyl alcohol and 20 g. butane-1,4-diol dimethacrylate. The pearl polymerization takes place in a manner analogous to that described in Example 1. The gel obtained has a swelling factor of 5.5 ml./g. in tetrahydrofuran.

Instead of butane-1,4-diol dimethacrylate, hexane-1,6-diol dimethacrylate can be used with equal success.

Example 10

(a) In a manner analogous to that described in Example 2a, 50 g. polyethylene oxide (average M.W. 1000) are reacted with methacrylic acid chloride. The toluene is removed under reduced pressure.

(b) The polyethylene glycol dimethacrylate thus produced is mixed with 100 g. amyl alcohol and 0.2 g. azo-isobutyronitrile and polymerized between two glass plates at 60° C. The transparent membrane thus obtained, whose thickness, depending upon the distance between the two glass plates, is between about 1 and 3 mm., is washed with acetone to remove the amyl alcohol and then stored under water.

The membrane thus obtained can also be produced by melting polyethylene glycol dimethacrylate at about 50° C., dissolving 0.2 g. azo-isobutyronitrile therein and then polymerizing the mixture between two glass plates.

Example 11

(a) 200 g. polyethylene oxide (average M.W. 5000) are dissolved in 300 ml. benzene, with gentle warming, and then reacted with 12 g. methacrylic acid chloride in the presence of 13 g. triethylamine. After 5 hours, the reaction mixture is diluted with a further 300 ml. benzene. The triethylamine hydrochloride formed is filtered off and the benzene removed under reduced pressure.

(b) 50 g. of the polyethylene glycol dimethacrylate obtained in Example 11a are melted at 60° C. The melt is mixed with 0.2 g. azo-isobutyronitrile and polymerized at 60° C. between two glass plates. There is obtained a slightly opalescent membrane, the thickness of which depends upon the distance between the two glass plates.

Example 12

50 g. of the polyethylene glycol dimethacrylate obtained in Example 11a are dissolved in 100 ml. water and mixed with a solution of 0.2 g. potassium persulphate and 0.8 g.

sodium sulphite in 50 ml. water. The mixture obtained is poured out into a thin layer to form films, the thicknesses of which can be of the order of 0.1 to several mm. It is also possible to form the mixture into any other desired shape. The mixture gels after a few minutes at ambient temperature.

Example 13

25 g. each of the polyethylene glycol dimethacrylates obtained in Examples 10a and 11a are melted together at a temperature between 50 and 60° C., and the mixture is then mixed with 0.2 g. azo-isobutyronitrile. The polymerization of this mixture is carried out between two glass plates. A membrane is obtained with a particularly high elasticity.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A particulate polymeric product consisting essentially of porous particles of a swellable gel polymer of an ester selected from the group consisting of dimethacrylate and diacrylate esters of one of the formulae

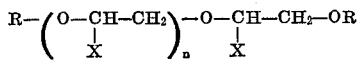

and

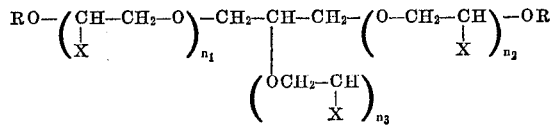

and mixtures thereof, wherein R is a member of the group consisting of $CH_2=CHCO-$ and $CH_2=C(CH_3)CO-$, X is a member of the group consisting of H and $CH_3$ and $n$ is an integer from 0 to $10^5$, $n_1$, $n_2$ and $n_3$ are whole integers the sum of which is 3 to $10^4$, said polymer having a particle size of 0.001–5 mm. in an unswollen state, a swelling factor of between 2 and 20 ml./g., a pore size providing an exclusion limit of $10^3$ to $10^8$ molecular weight and a bulk density between about 7 and 10 ml./g.

2. A polymeric product according to claim 1 wherein $n$ is an integer from 1 to 1,000 and the sum of $n_1$, $n_2$ and $n_3$ is an integer from 20 to 100.

3. A polymeric product according to claim 2 wherein the ester comprises 0.01–40% by weight of a cross-linking agent containing at least two vinyl groups.

4. A polymeric product according to claim 3 wherein the cross-linking agent is an acrylic or methacrylic acid diester of an alkylene glycol containing 4–6 carbon atoms.

5. A polymer according to claim 4 wherein the cross-linking agent is selected from the group consisting of diacrylate and dimethacrylate esters of butane-1,4-diol and hexane-1,6-diol.

6. A polymeric product according to claim 2 wherein the particles have a size of 0.01–0.5 mm. in an unswollen state.

7. A polymeric product according to claim 2 having a swelling factor of 2–10 ml./g.

8. A polymeric product according to claim 2 wherein the ester is a dimethacrylate ester.

9. A polymeric product of claim 1 free of metal catalyst residue.

10. A polymeric product according to claim 2 consisting essentially of a polymer of an ester of the formula

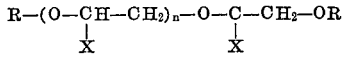

11. A polymeric product according to claim 2 consisting essentially of a polymer of an ester of the formula

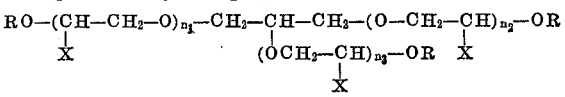

12. A polymeric product according to claim 11 wherein X is $CH_3$.

13. A polymer according to claim 2 having a particle size between 0.01 and 0.5 mm. in an unswollen state and a swelling factor between 2 and 10 ml./g.

References Cited

UNITED STATES PATENTS

| | | | |
|---|---|---|---|
| 3,030,349 | 4/1962 | Stickney et al. | 260—89.5 |
| 3,479,246 | 11/1969 | Stapleton | 161—218 |
| 3,041,322 | 6/1962 | Krieble | 260—89.5 |
| 2,888,410 | 5/1959 | Buchholz | 260—2.5 |

JOSEPH L. SCHOFER, Primary Examiner

J. KIGHT III, Assistant Examiner

U.S. Cl. X.R.

210—22, 31; 260—78.5 UA, E, 79.3 M, 80.7, 80.71, 80.73, 80.76, 80.81, 83.5, 86.1 E, 86.7, 89.5 R, A

UNITED STATES PATENT OFFICE
CERTIFICATE OF CORRECTION

Patent No. 3,681,269          Dated August 1, 1972

Inventor(s)  WALTER HEITZ ET AL.

It is certified that error appears in the above-identified patent and that said Letters Patent are hereby corrected as shown below:

In Claim 1, line 2 of the second formula,

" $(OCH_2-CH)_{n3}$ " should be -- $(OCH_2-CH)_{n3}-OR$ --.
$\phantom{(OCH_2-C}X$ $\phantom{should be -- (OCH_2-C}X$ Signed and sealed this 29th day of May 1973.

(SEAL)
Attest:

EDWARD M. FLETCHER, JR.          ROBERT GOTTSCHALK
Attesting Officer                Commissioner of Patents